(12) United States Patent
Reinharz et al.

(10) Patent No.: US 7,594,783 B2
(45) Date of Patent: Sep. 29, 2009

(54) CUTTING TOOL

(75) Inventors: Hagai Reinharz, Nahariya (IL);
Alexander Khina, Kfar Vradim (IL);
Petrus Antonius Van Gent, Eindhoven (NL)

(73) Assignee: Iscar, Ltd., Tefen (IL)

( * ) Notice: Subject to any disclaimer, the term of this patent is extended or adjusted under 35 U.S.C. 154(b) by 136 days.

(21) Appl. No.: 11/695,292

(22) Filed: Apr. 2, 2007

(65) Prior Publication Data

US 2007/0231087 A1 Oct. 4, 2007

(30) Foreign Application Priority Data

Apr. 2, 2006 (IL) .................................... 174720

(51) Int. Cl.
B23C 5/12 (2006.01)
B23B 27/16 (2006.01)
(52) U.S. Cl. .............................. 407/42; 407/60; 407/53
(58) Field of Classification Search .................. 407/33, 407/34, 40, 47, 53, 66, 42
See application file for complete search history.

(56) References Cited

U.S. PATENT DOCUMENTS

| | | | |
|---|---|---|---|
| 1,898,732 A * | 2/1933 | Krohne | 407/31 |
| 2,355,865 A * | 8/1944 | Hofbauer | 407/31 |
| 4,147,193 A * | 4/1979 | Kivimaa | 144/235 |
| 4,263,949 A * | 4/1981 | Kivimaa | 144/235 |
| 4,560,308 A | 12/1985 | Deller | |
| 4,808,044 A * | 2/1989 | Tsujimura et al. | 407/42 |
| 4,963,059 A | 10/1990 | Hiyama | |
| 5,052,863 A | 10/1991 | Satran | |
| 5,071,292 A | 12/1991 | Satran | |
| 5,158,402 A | 10/1992 | Satran et al. | |
| 5,322,394 A | 6/1994 | Okanishi et al. | |
| 5,382,118 A | 1/1995 | Satran et al. | |
| 5,486,073 A | 1/1996 | Satran et al. | |
| 5,727,911 A | 3/1998 | Satran et al. | |
| 5,779,399 A | 7/1998 | Kuberski | |
| 5,984,592 A * | 11/1999 | Harper et al. | 407/40 |
| 6,105,467 A | 8/2000 | Baker | |
| 6,485,220 B2 | 11/2002 | Hecht | |

(Continued)

FOREIGN PATENT DOCUMENTS

DE 3700754 7/1987

(Continued)

OTHER PUBLICATIONS

International Search Report, Jul. 31, 2007, 2 pp.

*Primary Examiner*—Boyer D Ashley
*Assistant Examiner*—Sara Addisu
(74) *Attorney, Agent, or Firm*—Womble Carlyle

(57) ABSTRACT

A mill has a front cutting portion with a plurality of peripheral cutting edges extending rearwardly from a front cutting end. Each peripheral cutting edge is adapted to generate a corresponding outer envelope of a body of revolution as the mill rotates around its longitudinal axis. At least one cutting edge is adapted to generate a cylindrical outer envelope; at least one cutting edge is adapted to generate a generally frusto-conical taper outer envelope extending away from the front cutting end while tapering radially outwardly; and at least one cutting edge is adapted to generate a generally frusto-conical dovetail outer envelope extending away from the front cutting end while tapering radially inwardly.

22 Claims, 6 Drawing Sheets

U.S. PATENT DOCUMENTS

| | | | |
|---|---|---|---|
| 6,494,648 B2 | 12/2002 | Harpaz | |
| 6,997,651 B2 | 2/2006 | Kawai et al. | |
| 7,313,992 B2 * | 1/2008 | Hall | 82/46 |
| 2005/0053432 A1 * | 3/2005 | Hall | 407/33 |
| 2005/0053440 A1 * | 3/2005 | Hall | 409/132 |

FOREIGN PATENT DOCUMENTS

| | | |
|---|---|---|
| DE | 3706282 | 9/1987 |
| DE | 102004040580 | 3/2006 |
| WO | WO/2005/032776 | 4/2005 |

* cited by examiner

CUTTING TOOL

RELATED APPLICATIONS

This application claims the benefit of the filing date of Israel Patent Application No. 174720 filed Apr. 2, 2006, which is incorporated in its entirety herein.

FIELD

This invention relates generally to machining tools and, more particularly, to rotating cutting tools.

BACKGROUND

Machining work pieces by rotary cutting tools may cause objectionable vibrational harmonics to occur. This may result in chatter and other undesirable phenomena, which may cause flaws in the machined product. In addressing these phenomena, it is not desirable to alter rotational speeds of a machine tool and rate of advance speeds of a cutting tool because this may interfere with optimal productivity. One known method to address this is to vary circumferential spacing of inserts and their pockets in a rotary cutting tool to break up harmonics which might otherwise occur. Another known method is to vary rake angles among inserts.

It is an object of the present disclosure to provide a tool that at least reduces or overcomes the aforementioned disadvantages.

BRIEF DESCRIPTION OF THE DRAWINGS

For a better understanding of the present disclosure and to show how the same may be carried out in practice, reference will now be made to the accompanying drawings, in which.

Figure 1:
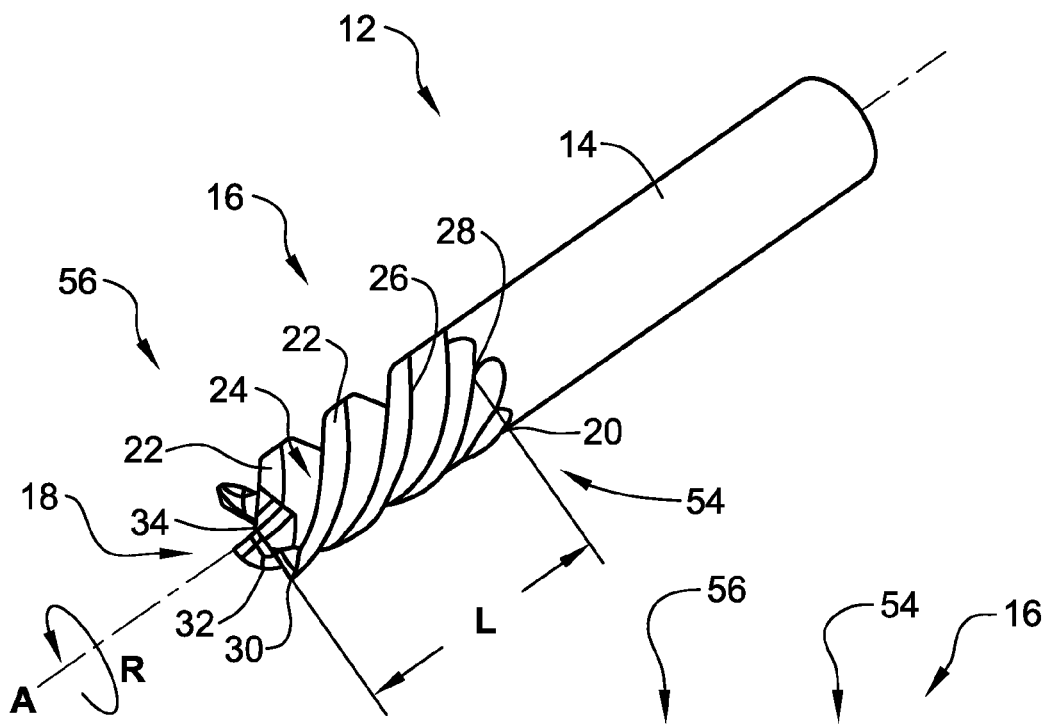
FIG. 1 shows a perspective view of a mill in accordance with a first exemplar embodiment of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION OF THE PREFERRED EMBODIMENTS

Figure 2:
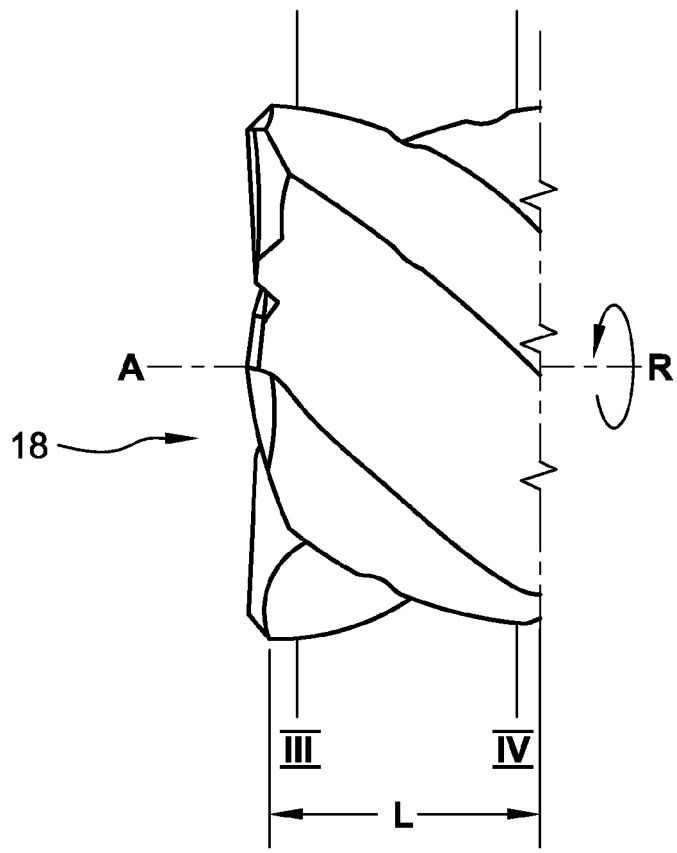
FIG. 2 shows a side elevational view of a cutting portion of the mill shown in FIG. 1.

With reference to FIGS. 1 and 2, a mill 12 in accordance with a first embodiment of the present disclosure has a longitudinal axis A defining a front-to-rear direction and a direction of rotation R. It should be noted that directional terms appearing throughout the specification and claims, e.g. "forward", "rear", etc., (and derivatives thereof) are for illustrative purposes only. The mill 12 has a rear shank 14 and a front cutting portion 16 extending longitudinally from a forwardly facing cutting portion face 18 to a rear termination 20 adjacent the shank 14. The cutting portion 16 may be of an integral construction and detachably secured to the shank 14, as is known, for example, from U.S. Pat. Nos. 6,494,648, and 6,485,220, which are incorporated here by reference in their entirety. Additionally, the cutting portion 16 may be integrally formed with the shank 14, as is known, from example, from U.S. Pat. Nos. 6,997,651, 5,779,399, 4,560,308, 6,105,467, and 5,322,394, which are incorporated here by reference in their entirety.

The cutting portion 16 may be made from carbides, ceramics, cermets, or any other appropriate material. The cutting portion 16 may be manufactured in powder metallurgy methods, such as pressing or injection molding, and subsequent sintering. Such materials and methods are well-known in the industry, and are described, for example, in the *World Directory and Handbook of Hardmetals and Hard Materials*, Fifth Edition, published by International Carbide Data, which is incorporated by reference herein. The cutting portion 16 also may be manufactured from any hard and tough material, such as high-speed steel (known in the industry as HSS), hard materials blanks, or by any appropriate method of material shaping.

The cutting portion 16 has four helical teeth 22 integrally formed therewith, each defined between a preceding and a succeeding flute 24. Each flute 24 extends rearwardly from the cutting portion face 18 to the termination 20. However, different mills may have other cutting portions which may be formed with other numbers of teeth for example 3, 5, 6, or more. Each tooth 22 has a peripheral edge 26 extending from a rear tooth end 28 adjacent the termination 20 to a tooth front end 30 at the cutting portion face 18, defining a peripheral edge length L. Each tooth 22 additionally has a subsidiary edge 32 extending from the tooth front end 30 of the peripheral edge 26 inwardly along the cutting portion face 18, to an inner end of the tooth 34. As the mill 12 rotates, each peripheral edge 26 generates a corresponding body of revolution concentric with the longitudinal axis A.

Figure 3:
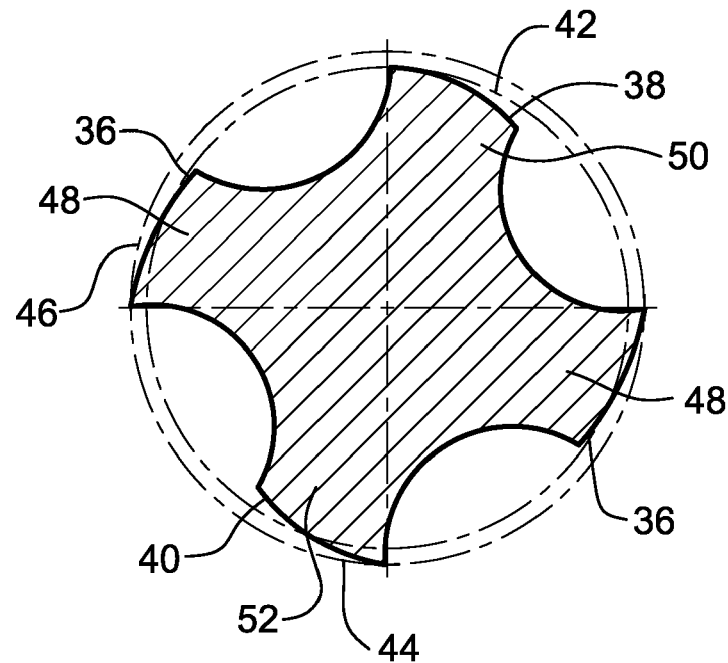
FIG. 3 shows a section view of the cutting portion taken along the line III-III of FIG. 2.
Figure 4:
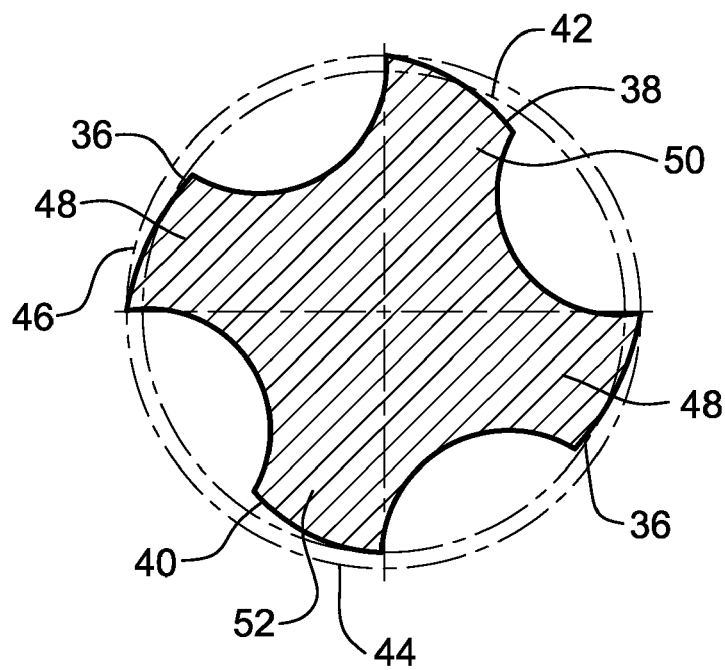
FIG. 4 shows a section view of the cutting portion taken along the line IV-IV of FIG. 2.

FIG. 3 shows a cross-section taken from a front portion 56 of the peripheral edge length L, and FIG. 4 shows a cross-section taken from a rear portion 54 of the peripheral edge length L. Both cross sections showing two cylinder teeth 48, a taper tooth 50 and a dovetail tooth 52. Of the four peripheral edges 26, two opposing peripheral edges 26 of the cylindrical teeth 48 constitute cylindrical edges 36, which generate a cylindrical body of revolution as the mill 12 rotates around its longitudinal axis A. The cylindrical bodies of revolution overlap with their cylindrical outer envelopes 46 of each of the two cylindrical edges 36. The other two peripheral edges 26 constitute non-cylindrical peripheral edges. One of the two non-cylindrical peripheral edges 26 is of the taper tooth 50 that constitutes a taper edge 38, which generates a tapering body of revolution with a taper outer envelope 42 as the mill 12 rotates around its longitudinal axis A. The other of the two non-cylindrical peripheral edges 26 is of the dovetail tooth 52 that constitutes a dovetail edge 40, which generates a dovetail body of revolution with a dovetail outer envelope 44 as the mill 12 rotates around its longitudinal axis A.

Figure 5A:
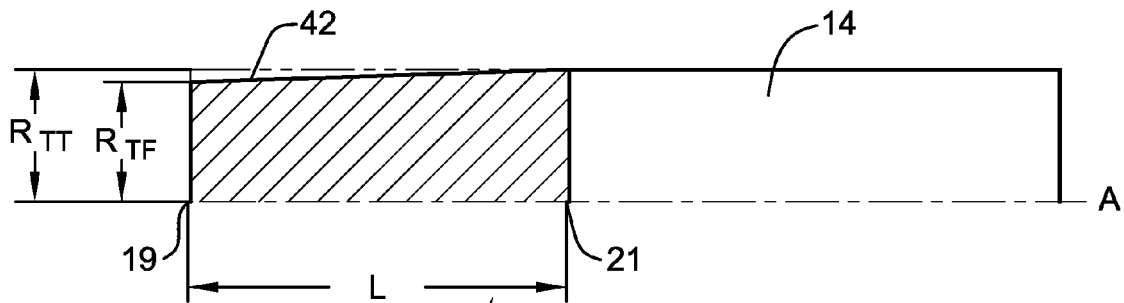
FIG. 5A shows a schematic depiction of the outer envelope generated by a taper tooth of the mill shown in FIG. 1.
Figure 5B:
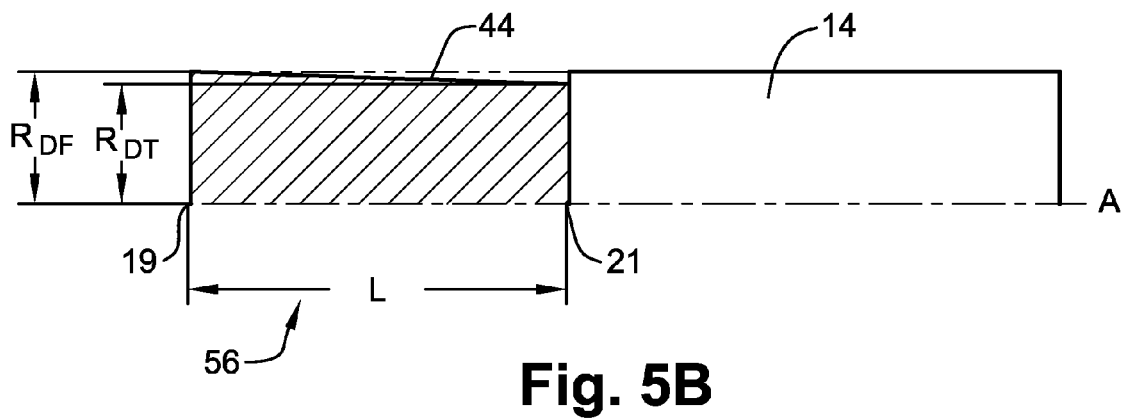
FIG. 5B shows a schematic depiction of the outer envelope generated by a dovetail tooth of the mill shown in FIG. 1.
Figure 5C:
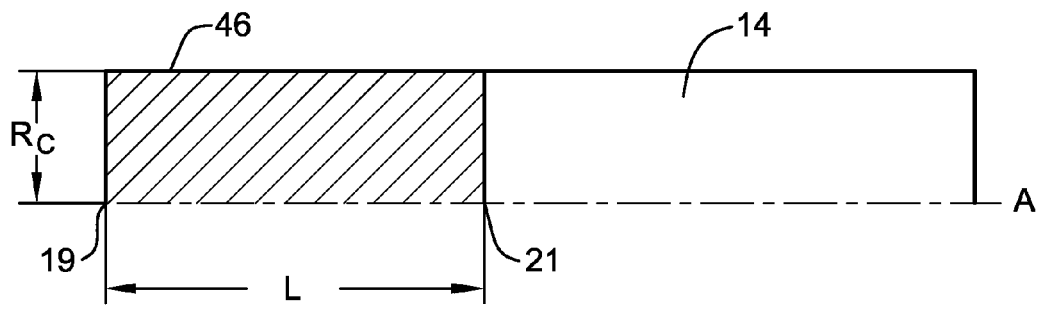
FIG. 5C shows a schematic depiction of the outer envelope generated by a cylindrical tooth of the mill shown in FIG. 1.

FIGS. 5A-C show a schematic depiction of the taper 42, dovetail 44 and cylindrical 46 outer envelopes, of the taper, dovetail and cylindrical bodies of revolution, respectively. The cylindrical outer envelope 46 extends from a front cutting end 19 at the cutting portion face 18 to a rear cutting end 21 at the termination 20, is parallel to the longitudinal axis A, and has a cylindrical radius $R_C$. The taper outer envelope 42 is of a generally frusto-conical shape extending coaxially with the longitudinal axis A from a front cutting end 19 at the cutting portion face 18 to a rear cutting end 21 at the termination 20, while tapering radially outwardly so that a taper termination radius $R_{TT}$ of the taper outer envelope 42 adjacent the termination 20 is greater than a taper face radius $R_{TF}$ of the taper outer envelope 42 adjacent the cutting portion face 18. In accordance with some embodiments of the present disclosure, the taper termination radius $R_{TT}$ is equal or approximately equal to the cylindrical radius $R_C$. The dovetail outer envelope 44 is of a generally frusto-conical shape extending coaxially with the longitudinal axis A from a front cutting end 19 at the cutting portion face 18 to a rear cutting end 21 at the termination 20 while tapering radially inwardly, so that a dovetail termination radius $R_{DT}$ of the dovetail outer envelope 44 adjacent the termination 20 is smaller than a dovetail face radius $R_{DF}$ of the dovetail outer envelope 44 adjacent the cutting portion face 18. In accordance with some embodiments of the present disclosure, the dovetail face radius $R_{DF}$ is equal or approximately equal to the cylindrical radius $R_C$.

When the mill 12 rotates and machines a workpiece (not shown), the peripheral cutting edge 26 of the cylinder tooth 48 mills the entire peripheral edge length L to a uniform radial depth of cut, the peripheral cutting edge 26 of the taper tooth 50 mills along a rear portion 54 of the peripheral edge length L, and the peripheral cutting edge 26 of the dovetail tooth 52 mills along a front portion 56 of the peripheral edge length L. The combined effect of the alternation of the cylinder, taper and dovetail teeth serves to stabilize the mill during machining and to significantly reduce chatter.

Figure 6:
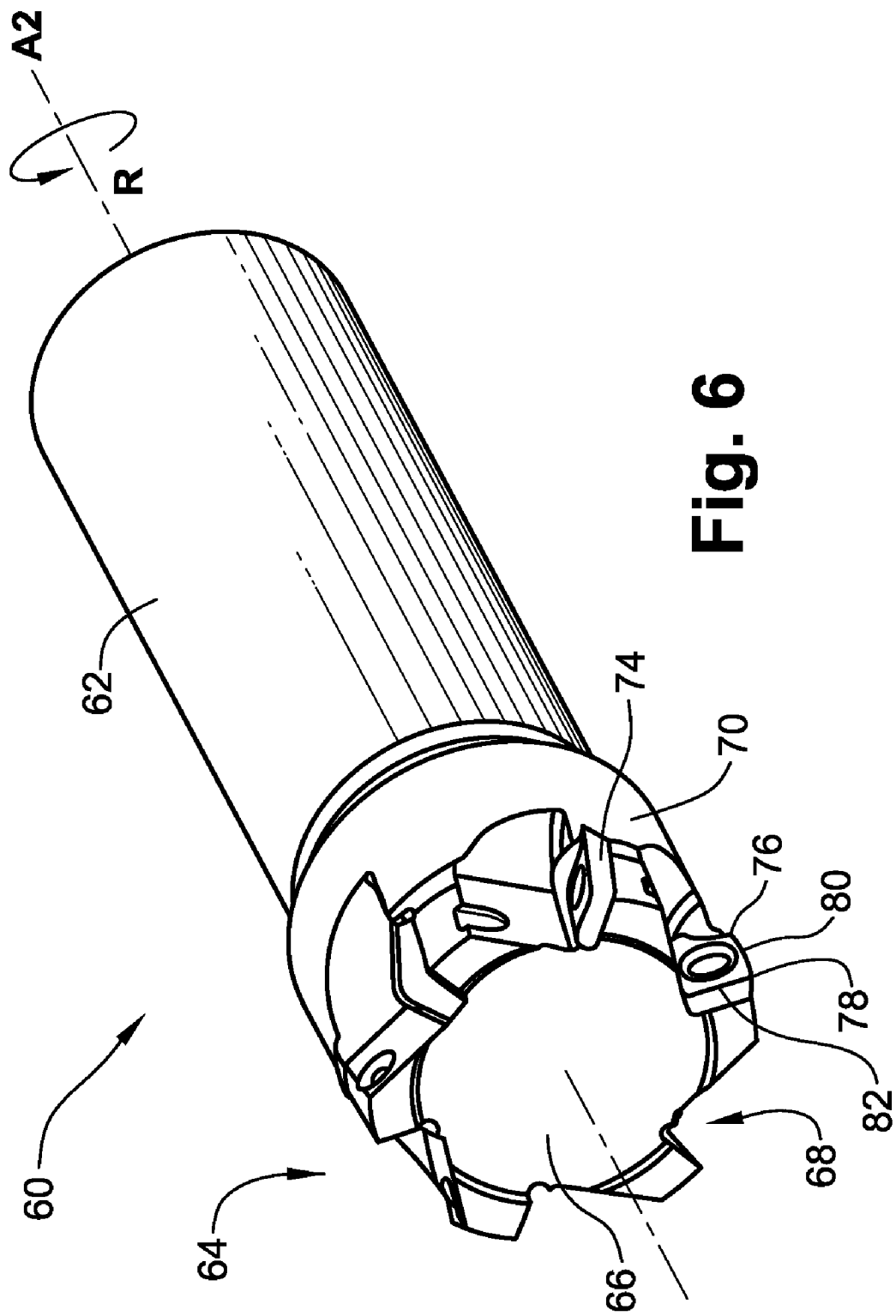
FIG. 6 shows a perspective view of a mill in accordance with a second exemplar embodiment of the present disclosure.
Figure 7:
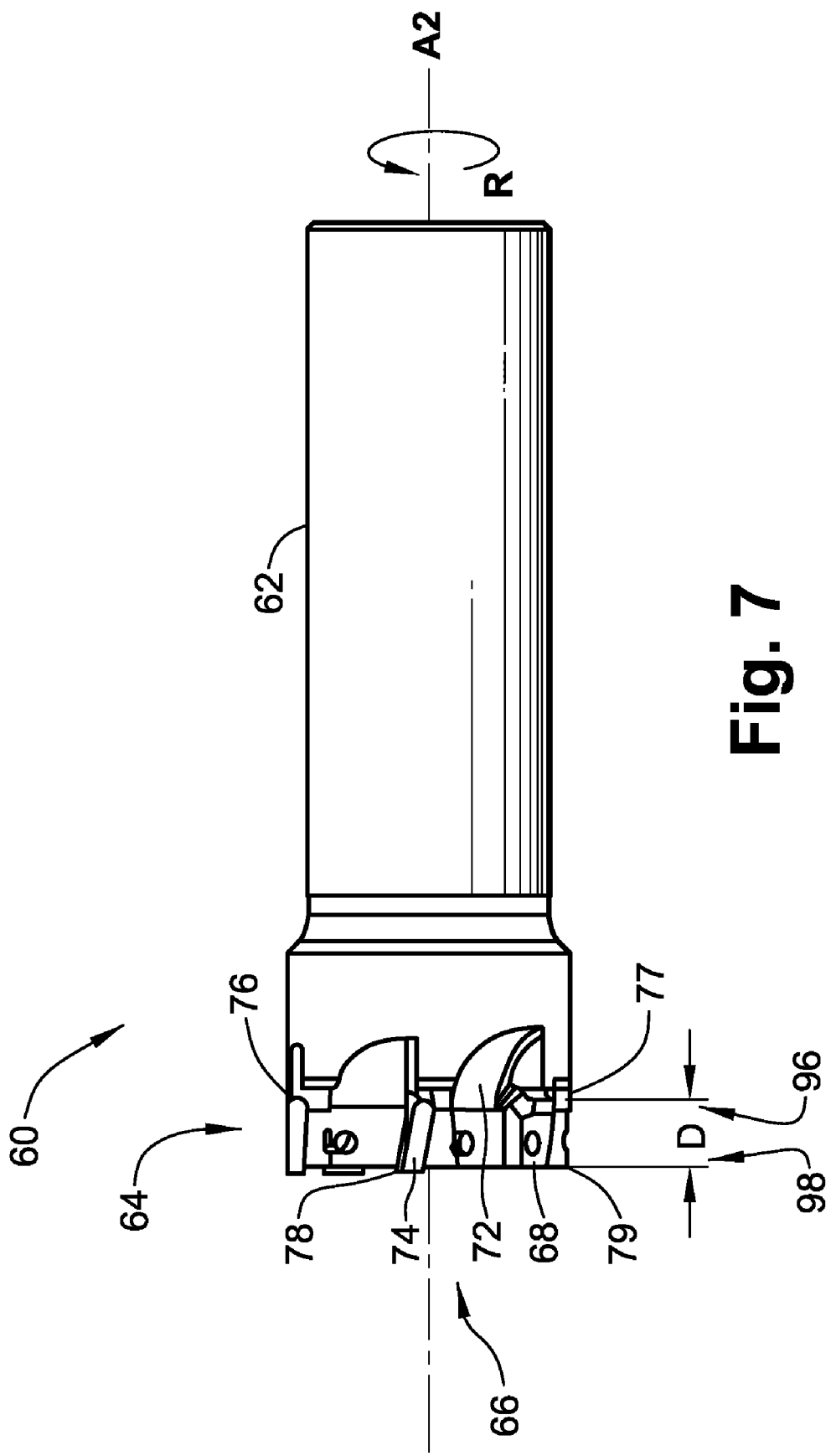
FIG. 7 shows a side view of the mill shown in FIG. 6.

With reference to FIGS. 6-7, a mill 60 in accordance with another exemplar embodiment of the present disclosure has a longitudinal axis A2 defining a front-to-rear direction and a direction of rotation R. The mill 60 has a rear shank 62 and a front cutting portion or end 64. The shank 62 may be integrally formed with the cutting portion 64. The cutting portion 64 may also be detachably secured to the shank 62, as is well-known in the art. The construction of the shank 62 of the mill 60 and its attachment to the cutting portion 64 are within the scope of the knowledge of one skilled in the art and will not be further discussed herein.

The cutting portion 64 has a front face 66, with six pockets 68 formed around a perimeter 70 thereof. Each pocket 68 opens tangentially forwardly to a preceding flute 72 and radially outwardly away from the perimeter 70. Each pocket 68 may accommodate one insert 74. It is understood that different mills may be formed with a different number of pockets, for example, 3, 4, 5, 7, 8, 9, etc. Moreover, the shape of the inserts, the shape of the pockets that are adapted to securely accommodate the inserts during operation of the mill, and the method and means by which the inserts may be releasably secured in their respective pockets are within the scope of the knowledge of one skilled in the art and will not be further discussed herein.

The inserts 74 may be made from carbides, ceramics, cermets or any other appropriate material, in powder metallurgy methods, such as pressing or injection molding, and subsequent sintering. Such materials and methods are well-known in the industry, and are described, for example, in the *World Directory and Handbook of Hardmetals and Hard Materials*, Fifth Edition, published by International Carbide Data, which is incorporated by reference herein. The inserts 74 also may be manufactured from any hard and tough material, such as high-speed steel (known in the industry as HSS), or hard materials blanks, by any appropriate method of material shaping. The inserts 74 may be in a shape of a generally rectangular prism. The inserts 74 may also be of any appropriate design known in the industry, such as those disclosed in U.S. Pat. Nos. 5,486,073, 5,071,292, 5,052,863, 5,382,118, 5,727,911, and 5,158,402 all of which are incorporated by reference herein in their entirety.

When releasably secured in the pocket 68, the insert 74 has a radially outer peripheral edge 80 extending generally forwardly from a rear corner 76 constituting a termination 77 of the outer peripheral edge 80, and a front corner 78 at a front cutting end 79, defining a cutting depth D of the cutting portion 64. A subsidiary cutting edge 82 extends from the front corner 78 of the peripheral edge 80 inwardly along the end face 66. As the cutting portion 64 rotates around its longitudinal axis A2, each peripheral edge 80 generates a corresponding body of revolution concentric with the longitudinal axis A2.

Figure 8A:
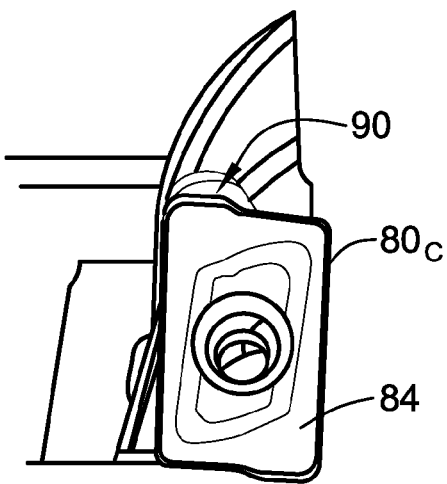
FIG. 8A shows a side view of a cylindrical pocket of the mill shown in FIG. 6.
Figure 8B:
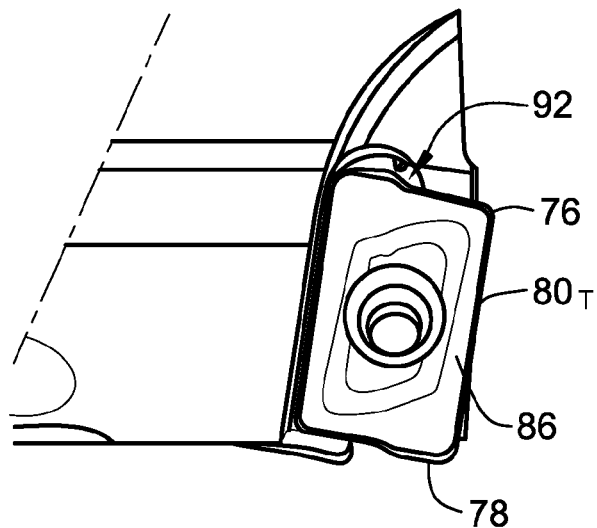
FIG. 8B shows a side view of a taper pocket of the mill shown in FIG. 6.
Figure 8C:
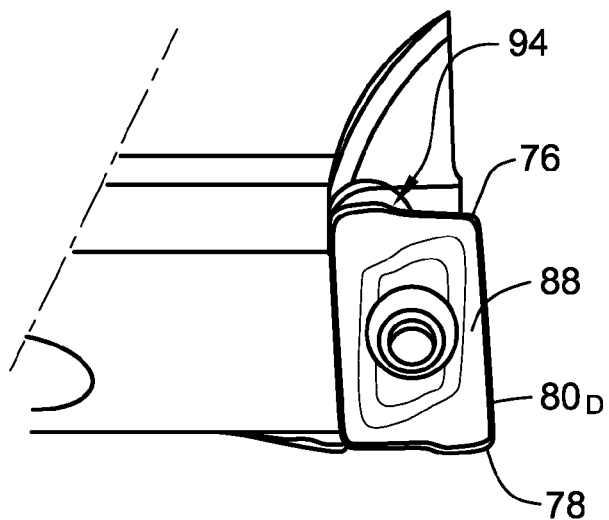
FIG. 8C shows a side view of a dovetail pocket of the mill shown in FIG. 6.

FIGS. 8A-C show detailed pockets 68 of the mill 60. More specifically, FIG. 8A shows a cylindrical pocket 90, FIG. 8B shows a taper pocket 92, and FIG. 8C shows a dovetail pocket 94. Cutting inserts designated as 84, 86, and 88 are secured in the cylindrical pocket 90, the taper pocket 92, and the dovetail pocket 94, respectively. Inserts 84, 86, and 88 may be identical, distinguishable only by the pocket in which they are secured. The peripheral cutting edge $80_C$ of cutting insert 84 generates a cylindrical body of revolution with a cylindrical outer envelope parallel to the longitudinal axis A2 having a cylindrical radius $R_C$ as the mill 60 rotates around its longitudinal axis A2. This cylindrical outer envelope is similar to the cylindrical outer envelope 46 shown in FIGS. 3-5 and described above. The peripheral cutting edge $80_T$ of cutting insert 86 has a positive lead angle, generates an outer envelope of a generally frusto-conical taper shape as the mill 60 rotates around its longitudinal axis A2, and extends generally coaxially with the longitudinal axis A2 from the front corner 78 at the front cutting end 79 to the rear corner 76 at the termination 77 while tapering radially outwardly. So configured, a taper termination radius $R_{TT}$ of the taper outer envelope adjacent the termination 77 is greater than a taper front radius $R_{TF}$ of the taper envelope adjacent the front face 66. This taper outer envelope is similar to the taper outer envelope 42 shown in FIGS. 3-5 and described above. The taper termination radius $R_{TT}$ is equal or approximately equal to the cylindrical radius $R_C$. The peripheral edge $80_D$ of insert 88 has a negative lead angle, generates an outer envelope of a generally frusto-conical dovetail shape as the mill 60 rotates around its longitudinal axis A2, and extends generally coaxially with the longitudinal axis A2 from the front corner 78 to the rear corner 76 while tapering radially inwardly. So configured, a dovetail front corner radius $R_{DF}$ of the dovetail outer envelope adjacent the front corner 78 is greater than a dovetail termination radius $R_{DT}$ of the dovetail outer envelope adjacent the rear corner 76. This dovetail outer envelope is similar to the dovetail outer envelope 44 shown in FIGS. 3-5 and described above. The dovetail front corner radius $R_{CF}$ is equal or approximately equal to the cylindrical radius $R_C$.

When the mill 60 rotates around its longitudinal axis A2 and machines a workpiece (not shown), the peripheral cutting edge $80_C$ of the insert 84 mills the entire cutting depth D to a uniform radial depth of cut, the peripheral edge $80_T$ of insert 86 mills along a rear portion 96 of the cutting depth D, and the peripheral edge $80_D$ of insert 88 mills along a front portion 98 of the cutting depth D.

The six pockets of the mill 60 in this embodiment are arranged as three opposing pairs configured as cylindrical pocket 90, taper pocket 92, dovetail pocket 94, cylindrical pocket 90, taper pocket 92, dovetail pocket 94 around the perimeter 70. Inserts 84, 86, and 88 may be releasably secured in the cylindrical pocket 90, the taper pocket 92, and the dovetail pocket 94, respectively. The combined effect of the alternation of the peripheral cutting edge $80_C$, the peripheral cutting edge $80_T$, and the peripheral edge $80_D$ of inserts 84, 86, and 88, respectively, serves to stabilize the mill during machining, and to significantly reduce chatter.

Different mills in other embodiments of the disclosure, however, may be made with a different number of pockets and/or differently ordered pockets. For instance, eight pockets may be configured as cylindrical pocket 90, taper pocket 92, cylindrical pocket 90, dovetail pocket 94, cylindrical pocket 90, taper pocket 92, cylindrical pocket 90, dovetail pocket 94 around the perimeter 70 or three pockets may be configured as cylindrical pocket 90, taper pocket 92, dovetail pocket 94 around the perimeter 70, or any other desired arrangement.

While a number of exemplary aspects and embodiments have been discussed above, those of skill in the art will recognize certain modifications, permutations, additions and sub-combinations thereof. Furthermore, those of skill in the art should, in light of the present disclosure, appreciate that many changes can be made in the specific exemplar embodiments disclosed herein, and still obtain like or similar results without departing from the spirit and scope of the disclosure. It is therefore intended that the following appended claims and claims hereafter introduced be interpreted to include all such modifications, permutations, additions and sub-combinations as are within their spirit and scope.

The invention claimed is:

1. A mill having a longitudinal axis and a direction of rotation thereabout comprising:
    a front cutting end;
    at least one first cutting edge extending rearwardly from the front cutting end and being adapted to generate a generally cylindrical outer envelope;
    at least one second cutting edge extending rearwardly from the front cutting end and being adapted to generate a first generally frusto-conical outer envelope tapering radially outward when proceeding along the longitudinal axis away from the front cutting end; and
    at least one third cutting edge extending rearwardly from the front cutting end and being adapted to generate a second generally frusto-conical outer envelope tapering radially inward when proceeding along the longitudinal axis away from the front cutting end.

2. The mill according to claim 1 further comprising a rear cutting end and wherein the generally cylindrical outer envelope has a cylindrical radius, the first generally frusto-conical outer envelope has a first taper termination radius adjacent the rear cutting end, the second generally frusto-conical outer envelope has a second taper front radius adjacent the front cutting end, and the first taper termination radius and the second taper front radius are at least approximately equal to the cylindrical radius.

3. The mill according to claim 1 further comprising a rear cutting end and wherein the generally cylindrical outer envelope has a cylindrical radius, the first generally frusto-conical outer envelope has a first taper front radius adjacent the front cutting end, the second generally frusto-conical outer envelope has a second termination radius adjacent the rear cutting end and the first taper front radius and the second termination radius are less than the cylindrical radius.

4. The mill according to claim 1, further comprising:
    a forwardly facing cutting portion face;
    a front cutting portion extending longitudinally from the forwardly facing cutting portion face to a rear termination;
    at least one first helical tooth on which the at least one first cutting edge is formed;
    at least one second helical tooth on which the at least one second cutting edge is formed; and
    at least one third helical tooth on which the at least one third cutting edge is formed.

5. The mill according to claim 4, wherein:
    the cylindrical outer envelope has a generally cylindrical radius;
    the first generally frusto-conical outer envelope has a termination radius adjacent the rear termination;
    the second generally frusto-conical outer envelope has a front radius adjacent the cutting portion face; and
    wherein the termination radius and the front radius are approximately equal to the cylindrical radius. the first taper front radius and the second termination radius are less than the cylindrical radius.

6. The mill according to claim 4, comprising an even number of helical teeth.

7. The mill according to claim 4, wherein at least two first cutting edges disposed opposite of each other generate the generally cylindrical outer envelope.

8. The mill according to claim 7, wherein at least one of the second cutting edge and the third cutting edge is disposed between the at least two first cutting edges.

9. A mill having a longitudinal axis and a direction of rotation thereabout comprising:
    a cutting portion having a front cutting end;
    a plurality of inserts secured around a perimeter of the cutting portion;
    each of the plurality of cutting inserts comprising a peripheral edge extending rearwardly from a front corner adjacent the front cutting end to a rear corner;
    each peripheral edge being adapted to generate a corresponding outer envelope as the mill rotates; and
    wherein a first corresponding outer envelope comprises a generally cylindrical outer envelope, a second corresponding outer envelope comprises a frusto-conical outer envelope tapering radially outward when proceeding along the longitudinal axis away from the front cutting end, and a third corresponding outer envelope comprises a frusto-conical outer envelope tapering radially inward when proceeding along the longitudinal axis away from the front cutting end.

10. The mill according to claim 9 wherein the first corresponding outer envelope has a cylindrical radius and the second corresponding outer envelope has a taper termination radius adjacent the rear corner that is at least approximately equal to the cylindrical radius.

11. The mill according to claim 9 wherein the first corresponding outer envelope has a cylindrical radius and the third corresponding outer envelope has a front radius adjacent the front corner that is at least approximately equal to the cylindrical radius.

12. The mill according to claim 9 wherein the plurality of inserts comprises at least six inserts.

13. The mill according to claim 9 wherein at least two first peripheral cutting edges disposed opposite of each other generate the generally cylindrical outer envelope.

14. The mill according to claim 13 wherein at least one peripheral cutting edge adapted to generate at least one from the group consisting of the second corresponding outer envelope and the third corresponding outer envelope is disposed between the at least two first peripheral cutting edges disposed opposite of each other.

15. The mill according to claim 9 wherein at least some of the plurality of cutting inserts may be removed from the front cutting end.

16. The mill according to claim 9 wherein all of the cutting inserts are substantially identical.

17. A mill having a longitudinal axis and a direction of rotation thereabout comprising:
    a cutting portion having a front cutting end;
    a plurality of pockets around a perimeter of the front cutting end;
    each of the plurality of pockets adapted to releasably secure a cutting insert;
    at least a first pocket of the plurality of pockets adapted such that a peripheral edge of a cutting insert secured in the first pocket generates a corresponding cylindrical first outer envelope as the mill rotates;
    at least a second pocket of the plurality of pockets adapted such that a peripheral edge of a cutting insert secured in the second pocket generates a corresponding frustro-conical second outer envelope tapering radially outward when proceeding along the longitudinal axis away from the front cutting end as the mill rotates;
    at least a third pocket of the plurality of pockets adapted such that a peripheral edge of a cutting insert secured in the third pocket generates a corresponding frustro-conical third outer envelope tapering radially inward when proceeding along the longitudinal axis away from the front cutting end as the mill rotates.

18. The mill according to claim 17 wherein the first outer envelope has a cylindrical radius and the second outer envelope has a taper termination radius adjacent a rear corner of a peripheral edge of an insert releasably secured into the second pocket that is at least approximately equal to the cylindrical radius.

19. The mill according to claim 17 wherein the first outer envelope has a cylindrical radius and the third outer envelope has a front radius adjacent a front corner of a peripheral edge of an insert releasably secured into the third pocket that is at least approximately equal to the cylindrical radius.

20. The mill according to claim 17 wherein at least two first pockets are disposed opposite of each other on the front cutting end.

21. The mill according to claim 17 wherein at least one of a group comprising at least one of the second pockets and at least one of the third pockets is disposed between the at least two first pockets.

22. A mill having a longitudinal axis and a direction of rotation thereabout, comprising:
    a cutting portion having a front cutting end;
    a plurality of inserts secured around a perimeter of the cutting portion;
    each of the plurality of cutting inserts comprising a peripheral edge extending rearwardly from a front corner adjacent the front cutting end to a rear corner; and
    each peripheral edge being adapted to generate a corresponding outer envelope as the mill rotates;
    wherein:
    a first corresponding outer envelope comprises a generally cylindrical outer envelope having a cylindrical radius $R_c$;
    a second corresponding outer envelope comprises a frustro-conical taper outer envelope tapering radially outward when proceeding along the longitudinal axis away from the front cutting end, the frustro-conical taper outer envelope having a taper termination radius $R_{TT}$ adjacent the rear corner of its corresponding insert; and
    the taper termination radius $R_{TT}$ is at least approximately equal to the cylindrical radius $R_C$.

* * * * *